(12) United States Patent
Gou et al.

(10) Patent No.: US 12,107,686 B2
(45) Date of Patent: Oct. 1, 2024

(54) METHOD AND DEVICE FOR DETERMINING AND RECEIVING RESOURCES, ELECTRONIC DEVICE AND STORAGE MEDIUM

(71) Applicant: ZTE CORPORATION, Guangdong (CN)

(72) Inventors: Wei Gou, Guangdong (CN); Peng Hao, Guangdong (CN); Ting Fu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 563 days.

(21) Appl. No.: 17/598,368

(22) PCT Filed: Mar. 23, 2020

(86) PCT No.: PCT/CN2020/080584
§ 371 (c)(1),
(2) Date: Mar. 31, 2022

(87) PCT Pub. No.: WO2020/192609
PCT Pub. Date: Oct. 1, 2020

(65) Prior Publication Data
US 2023/0077055 A1    Mar. 9, 2023

(30) Foreign Application Priority Data
Mar. 28, 2019  (CN) .......................... 201910244435.3

(51) Int. Cl.
*H04L 1/1829*   (2023.01)
*H04L 1/1867*   (2023.01)
*H04L 5/00*     (2006.01)

(52) U.S. Cl.
CPC .......... *H04L 1/1861* (2013.01); *H04L 1/1896* (2013.01); *H04L 5/0055* (2013.01)

(58) Field of Classification Search
CPC ... H04L 1/1861; H04L 1/1896; H04L 5/0055; H04L 1/1854; H04L 5/0053; H04L 1/1864; H04L 5/0057; H04L 1/1812
See application file for complete search history.

(56) References Cited

U.S. PATENT DOCUMENTS

2017/0064675 A1    3/2017  Kim et al.
2019/0045546 A1    2/2019  Li
(Continued)

FOREIGN PATENT DOCUMENTS

| CN | 106961744 A | 7/2017 |
| EP | 3328142 A1 | 5/2018 |
| WO | WO 2018126934 A1 | 7/2018 |

OTHER PUBLICATIONS

3GPP TSG RAN WG1 Meeting #95; R1-1813114; Source: Nokia, Nokia Shanghai Bell; Title: On UCI Enhancements for URLLC; Spokane, WA, USA, Nov. 12-16, 2018. (Year: 2018).*
(Continued)

*Primary Examiner* — Mohammed S Chowdhury
(74) *Attorney, Agent, or Firm* — Perkins Coie LLP

(57) ABSTRACT

The present application relates to the field of communication technology. Disclosed by the embodiments of the present application are a method and device for determining and receiving resources, an electronic device, and a storage medium. The method for determining resources includes: multiplexing a plurality of Hybrid Automatic Repeat reQuest Acknowledgement (HARQ-ACK) codebooks in a designated Physical Uplink Control Channel (PUCCH) resource. The designated PUCCH resource at least includes one of: a PUCCH resource determined according to a PUCCH resource indicator (PRI) in last Downlink Control Information (DCI) of DCI corresponding to a Downlink Physical Shared Channel (PDSCH) corresponding to a HARQ-ACK codebook having a higher priority in the
(Continued)

receiving a designated PUCCH, and determining that a designated PUCCH resource is a PUCCH resource determined according to a PRI in last DCI of DCI corresponding to a PDSCH corresponding to a HARQ-ACK codebook having a higher priority or a PUCCH resource corresponding to the HARQ-ACK codebook having the higher priority; where a plurality of HARQ-ACK codebooks are multiplexed in the designated PUCCH resource, and the plurality of HARQ-ACK codebooks at least include the HARQ-ACK codebook having the higher priority ⟶ S302 plurality of HARQ-ACK codebooks, and a PUCCH resource corresponding to the HARQ-ACK codebook having the higher priority in the plurality of HARQ-ACK codebooks.

19 Claims, 2 Drawing Sheets

(56) References Cited

U.S. PATENT DOCUMENTS

| | | | |
|---|---|---|---|
| 2019/0082456 A1 | 3/2019 | Kim et al. | |
| 2021/0211241 A1* | 7/2021 | Xiong | H04W 72/0446 |
| 2021/0234643 A1* | 7/2021 | Wang | H04L 1/1887 |
| 2021/0352656 A1* | 11/2021 | Choi | H04L 5/0053 |
| 2021/0391955 A1* | 12/2021 | He | H04L 5/001 |

OTHER PUBLICATIONS

3GPP TSG RAN WG1 #96; R1-1901768, as submitted in IDS; Source: ZTE; Title: UL control enhancements for URLLC; Athens, Greece, Feb. 25-Mar. 1, 2019. (Year: 2019).*
3GPP TSG RAN WG1 RAN1#96; R1-1902494; Source: Intel Corporation; Title: On enhancements to UCI for eURLLC; Athens, Greece, Feb. 25-Mar. 1, 2019. (Year: 2019).*
India Patent Office, First Office Action issued Sep. 25, 2023 for application No. IN202117049157.
ZTE: "UL Control Enhancements for URLLC, R1-1901768", 3GPP TSG RAN WG1 #96, XP051599462, URL: https://www.3gpp.org/ftp/TSG_RAN/WG1_RL1/TSGR1_96/Docs/, Mar. 1, 2019.
European Communication under Rule 71(3) EPC issued in EP Patent Application No. 20776416.8, dated Apr. 22, 2024, 35 pages.
China Patent Office, First Office Action issued Jun. 6, 2022 for application No. CN201910244435.3.
ZTE:"UL control enhancements for URLLC", 3GPP TSG RAN WG1 #96 R1-1901768, Mar. 1, 2019.
CATT:"UL control enhancements for URLLC", 3GPP TSG RAN WG1 Meeting #95 R1-1812629, Nov. 2, 2018.
WIPO, International Search Report issued on Jun. 8, 2020.
ZTE. "UL control enhancements for URLLC," 3GPP TSG RAN WG1, Athens, Greece, Mar. 1, 2019.
Media Tek Inc. "Intra-UE multiplexing and prioritization between mixed traffic priorities," 3GPP TSG RAN WG1, Athens, Greece, Mar. 1, 2019.
Korean office action issued in KR Patent Application No. 10-2021-7035103, dated Mar. 26, 2024, 9 pages. English translation included.
Nokia et al., "On UCI Enhancements for URLLC," 3GPP TSG RAN WG1#96, R1-1901914, Athens, Greece, Feb. 25-Mar. 1, 2019, 11 pages.
WILUS Inc., "On UCI enhancement for NR URLLC," 3GPP TSG RAN WG1 #96, R1-1902873, Athens, Greece, Feb. 25-Mar. 1, 2019, 4 pages.
Interdigital, Inc., "URLLC UCI prioritization," 3GPP TSG RAN WG1 Meeting #94, R1-1808598, Gothenburg, Sweden, Aug. 20-24, 2018, 3 pages.

* cited by examiner

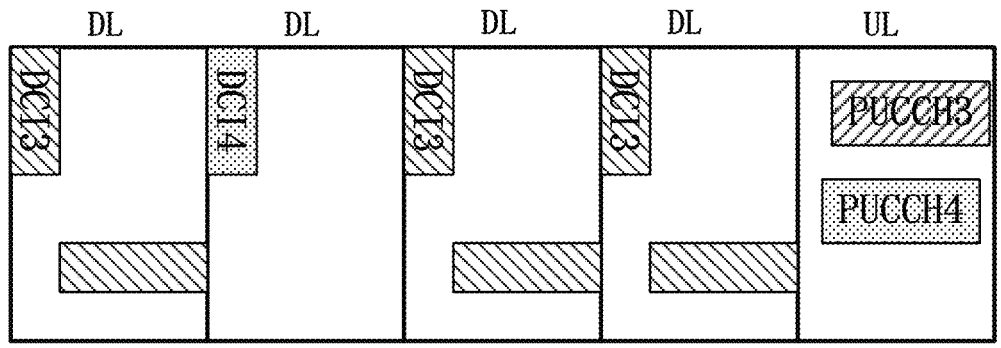

Fig. 1 multiplexing a plurality of HARQ-ACK codebooks in a designated PUCCH resource; where the designated PUCCH resource at least includes one of: a PUCCH resource determined according to a PRI in last DCI of DCI corresponding to a PDSCH corresponding to a HARQ-ACK codebook having a higher priority in the plurality of HARQ-ACK codebooks, and a PUCCH resource corresponding to the HARQ-ACK codebook having the higher priorityin the plurality of HARQ-ACK codebooks ⟶ S202

Fig. 2 receiving a designated PUCCH, and determining that a designated PUCCH resource is a PUCCH resource determined according to a PRI in last DCI of DCI corresponding to a PDSCH corresponding to a HARQ-ACK codebook having a higher priority or a PUCCH resource corresponding to the HARQ-ACK codebook having the higher priority; where a plurality of HARQ-ACK codebooks are multiplexed in the designated PUCCH resource, and the plurality of HARQ-ACK codebooks at least include the HARQ-ACK codebook having the higher priority ⟶ S302

Fig. 3

METHOD AND DEVICE FOR DETERMINING AND RECEIVING RESOURCES, ELECTRONIC DEVICE AND STORAGE MEDIUM

CROSS-REFERENCE TO RELATED APPLICATIONS

The present application is a National Stage of International Application No PCT/CN2020/080584, filed Mar. 23, 2020, which claims priority from the Chinese patent application No. 201910244435.3 filed with the China Patent Office on Mar. 28, 2019, both of which are incorporated in the present application by reference in their entireties.

The present application claims priority from the Chinese patent application No. 201910244435.3 filed with the China Patent Office on Mar. 28, 2019, the contents of which are incorporated in the present application by reference in entire.

TECHNICAL FIELD

The present application relates to the field of communication technology, for example, to a method and device for determining and receiving resources, an electronic device, and a storage medium.

BACKGROUND

In research of New Radio (NR) R16, an Ultra-Reliable and Low Latency Communications (URLLC) service is introduced. Compared with an Enhanced Mobile Broadband (eMBB) service, the URLLC service requires high reliability and timeliness, a transmission of which has a very strict delay requirement and must be completed within a required time, for example. However, the eMBB service generally has a less stringent delay requirement and can be transmitted through multiple retransmissions. Similarly, a Hybrid Automatic Repeat reQuest Acknowledgement (HARQ-ACK)/Scheduling Request (SR) corresponding to the URLLC service has the same requirement. However, compared to the URLLC and the HARQ-ACK/SR of the URLLC, the eMBB and its corresponding HARQ-ACK/SR have a low requirement, such as the multiple retransmissions.

In some cases, there may be two HARQ-ACK codebooks to be transmitted for a User Equipment (UE), and the two HARQ-ACK codebooks correspond to the URLLC and the eMBB respectively. It can be considered that the HARQ-ACK codebook corresponding to the URLLC has a higher priority, and the HARQ-ACK codebook corresponding to the eMBB has a lower priority. However, when the two HARQ-ACK codebooks are configured to be carried in one Physical Uplink Control Channel (PUCCH), reliability of the HARQ-ACK codebook having the higher priority cannot be ensured.

Meanwhile, in some cases, the two HARQ-ACK codebooks of the UE are allocated with PUCCH resources respectively, but two PUCCHs overlap in a time domain, and thus Uplink Control Information (UCI) in the two PUCCHs needs to be transmitted by being multiplexed in one PUCCH (which may be a new PUCCH resource or one of the two PUCCH resources). However, the reliability of the HARQ-ACK codebook having the higher priority cannot be ensured either in this case.

Therefore, there is still no good solution to the problem in the related art that the reliability of the HARQ-ACK codebook having the higher priority cannot be ensured after a plurality of HARQ-ACK codebooks are multiplexed, resulting in inconsistent understandings between a base station and a UE side of the PUCCH resource used after the plurality of HARQ-ACK codebooks are multiplexed.

SUMMARY

Embodiments of the present application provide a method and device for determining and receiving resources, an electronic device and a storage medium, to at least solve a problem that the reliability of high-priority HARQ-ACK codebooks cannot be ensured after a plurality of HARQ-ACK codebooks are multiplexed in the related art.

According to an embodiment of the present application, provided is a method for determining resources, including: multiplexing a plurality of HARQ-ACK codebooks in a designated PUCCH resource. The designated PUCCH resource at least includes one of: a PUCCH resource determined according to a PUCCH resource indicator (PRI) in last Downlink Control Information (DCI) of DCI corresponding to a Downlink Physical Shared Channel (PDSCH) corresponding to a HARQ-ACK codebook having a higher priority in the plurality of HARQ-ACK codebooks, and a PUCCH resource corresponding to the HARQ-ACK codebook having the higher priority in the plurality of HARQ-ACK codebooks According to another embodiment of the present application, provided is a method for receiving resources, including: receiving a designated PUCCH, and determining that a designated PUCCH resource is a PUCCH resource determined according to a PRI in last DCI of DCI corresponding to a PDSCH corresponding to a HARQ-ACK codebook having a higher priority or a PUCCH resource corresponding to the HARQ-ACK codebook having the higher priority. A plurality of HARQ-ACK codebooks are multiplexed in the designated PUCCH resource, and the plurality of HARQ-ACK codebooks at least include the HARQ-ACK codebook having the higher priority.

According to another embodiment of the present application, provided is a device for determining resources, including: a multiplexing module, configured to multiplex a plurality of HARQ-ACK codebooks in a designated PUCCH resource. The designated PUCCH resource at least includes one of: a PUCCH resource determined according to a PRI in last DCI of DCI corresponding to a PDSCH corresponding to a HARQ-ACK codebook having a higher priority in the plurality of HARQ-ACK codebooks, and a PUCCH resource corresponding to the HARQ-ACK codebook having the higher priority in the plurality of HARQ-ACK codebooks.

According to another embodiment of the present application, provided is a device for receiving resources, including: a receiving module, configured to receive a designated PUCCH, and determine that a designated PUCCH resource is a PUCCH resource determined according to a PRI in last DCI of DCI corresponding to a PDSCH corresponding to a HARQ-ACK codebook having a higher priority or a PUCCH resource corresponding to the HARQ-ACK codebook having the higher priority. A plurality of HARQ-ACK codebooks are multiplexed in the designated PUCCH resource, and the plurality of HARQ-ACK codebooks at least include the HARQ-ACK codebook having the higher priority.

According to another embodiment of the present application, provided is a storage medium storing a computer program thereon. The computer program is configured to perform a step in any one of the above-mentioned method embodiments.

According to another embodiment of the present application, provided is an electronic device, including a memory and a processor. The memory stores a computer program therein, and the processor is configured to execute the computer program to perform a step in any one of the above-mentioned method embodiments.

According to the present application, a used PUCCH resource after multiplexing of two HARQ-ACK codebooks is always determined by a PRI value in last DCI corresponding to a HARQ-ACK codebook having a higher priority (with high reliability), and the probability of the last DCI being missed is very low. Therefore, the inconsistency of understanding between a base station and UE sides of the PUCCH resource used after the multiplexing of the two HARQ-ACK codebooks is greatly reduced, thus ensuring the reliability of the HARQ-ACK codebook having the higher priority.

BRIEF DESCRIPTION OF THE DRAWINGS

The accompanying drawings described herein are used to provide a further understanding for the present application, and constitute a part of the present application. An illustrative embodiment of the present application and its description are intended to explain the present application, but not to constitute an improper limitation to the present application. In the accompanying drawings:

FIG. 1 is a schematic diagram of a time domain according to an embodiment of the present application;

FIG. 2 is a flowchart of a method for determining resources according to an embodiment of the present application;

FIG. 3 is a flowchart of a method for receiving resources according to an embodiment of the present application;

DETAILED DESCRIPTION

Figure 4:
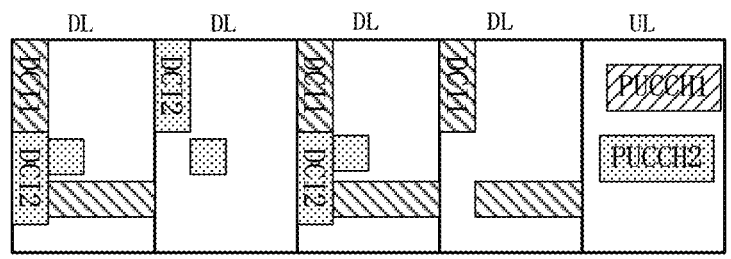
FIG. 4 is another schematic diagram of a time domain according to an embodiment of the present application.

The present application will be described in detail below with reference to the accompanying drawings in conjunction with embodiments. It should be noted that the embodiments of the present application and features therein may be combined with each other in any manner as long as they are not contradictory.

It should be also noted that terms "first", "second", and the like in the description, claims and the accompanying drawings of the present application are used for a purpose of distinguishing similar objects instead of indicating a specific order or sequence.

First Embodiment

A PUCCH resource of a HARQ-ACK codebook is determined according to a value of a PRI in last DCI of DCI corresponding to a PDSCH (note that some PDSCHs do not have corresponding DCI, for example, semi-static transmission PDSCH does not have corresponding DCI) corresponding to the HARQ-ACK codebook, by combining with a total number of bits of the HARQ-ACK codebook (for the convenience of the following description, the last DCI herein is called the last DCI corresponding to the HARQ-ACK codebook, and for more detailed rules for determining the last DCI, please refer to the rules in a protocol TS38.213). Specifically, the total number of the bits of the HARQ-ACK codebook is used to determine a corresponding PUCCH resource set, and then the value of the PRI is used to select a corresponding PUCCH resource from the PUCCH resource set. Each PUCCH resource set is configured with a range of a number of bits that are able to be carried. For example, a PUCCH resource set 0 is configured with a range of 1 to 2 bits, a PUCCH resource set 1 is configured with a range of 3 to 23 bits, and a PUCCH resource set 2 is configured with a range of 24 to 64 bits. For the PUCCH resource set 2, a number of bits that should be able to be carried in each PUCCH resource in the PUCCH resource set 2 ranges from 24 to 64.

In addition, with respect to a process in a case where two PUCCHs overlap with each other in a time domain, for example, a process in a case where a PUCCH of the HARQ-ACK codebook and a PUCCH of Channel State Information (CSI) overlap with each other in the time domain, in the related art, corresponding to a same UE, when a PUCCH resource of a HARQ-ACK codebook and a PUCCH resource of CSI overlap in the time domain, UCI in the two PUCCH resources will be multiplexed together and transmitted through a new PUCCH (which may be one of the original two PUCCH resources or a new PUCCH resource). At this point, the new PUCCH is still determined according to a value of a PRI in last DCI of DCI corresponding to UCI in the two PUCCHs. FIG. 1 is a schematic diagram of a time domain according to the embodiment of the present application. As shown in FIG. 1, a PUCCH3 schedules a plurality of HARQ-ACK codebooks of PDSCH (diagonal filled) for DCI3, a PUCCH4 is a semi-statically configured PUCCH carrying CSI (the PUCCH4 may also be a CSI transmission triggered by DCI4), and the PUCCH3 and the PUCCH4 overlaps with each other in the time domain. At this time, UCI in the PUCCH3 and the UCI the PUCCH4 are multiplexed and transmitted in a new PUCCH, a value of a PRI in last DCI of DCI (note that the PUCCH3 herein corresponds to 3 pieces of DCI, and the PUCCH4 corresponds to one piece of DCI, and there are 4 pieces of DCI in total; and the last DCI refers to the last DCI among the 4 pieces of DCI) corresponding to the UCI in the two PUCCHs is used to determine the new PUCCH, and the last DCI in FIG. 1 is DCI3 in a fourth time slot/sub-time slot.

Second Embodiment

A method for determining resources is provided in this embodiment. FIG. 2 is a flowchart of the method for determining resources according to the embodiment of the present application, and as shown in FIG. 2, the process includes the following step.

In step S202, a plurality of HARQ-ACK codebooks are multiplexed in a designated PUCCH resource. The designated PUCCH resource at least includes one of: a PUCCH resource determined according to a PRI in last DCI of DCI corresponding to a PDSCH corresponding to a HARQ-ACK codebook having a higher priority in the plurality of HARQ-ACK codebooks, and a PUCCH resource corresponding to the HARQ-ACK codebook having the higher priority in the plurality of HARQ-ACK codebooks.

Specifically, when there is the plurality of HARQ-ACK codebooks, for each HARQ-ACK, a corresponding HARQ-ACK codebook and a corresponding PUCCH resource will still be formed according to mechanisms in the related art.

Possible cases of multiplexing include but are not limited to one of a case where the plurality of HARQ-ACK codebooks are multiplexed in one PUCCH resource for transmission when PUCCH resources of the plurality of HARQ-ACK codebooks are indicated as a same PUCCH resource, and a case where the plurality of HARQ-ACK codebooks are multiplexed in one PUCCH resource for transmission when the PUCCH resources of the plurality of HARQ-ACK codebooks overlap with each other in the time domain.

The two HARQ-ACK codebooks multiplexed above have different priorities. A priority of a HARQ-ACK codebook depends on a priority of a PDSCH corresponding to the HARQ-ACK codebook or a priority of a service carried in the corresponding PDSCH. Typically, one HARQ-ACK codebook requires high reliability and a shorter delay, whereas other HARQ-ACK codebooks may require lower reliability and a longer delay.

To expand, the HARQ-ACK codebook may also be other information, such as SR information, CSI, or a combination of one or more of the HARQ-ACK, the SR and the CSI, so as to independently constitute pieces of information to be transmitted. When the pieces of information to be transmitted satisfies that one PUCCH resource is allocated for transmission, or PUCCH resources of the pieces of information to be transmitted overlap with each other in the time domain, the pieces of information to be transmitted is multiplexed in one PUCCH resource for transmission. The independently constituted pieces of information to be transmitted further have priorities among themselves, and determination of the priorities is similar to that of the HARQ-ACK codebooks. A typical number of the plurality of HARQ-ACK codebooks herein is two, and if there are more than two HARQ-ACK codebooks, they may be processed in a pairwise manner, that is a manner of processing each adjacent two of the HARQ-ACK codebooks by the above method.

Optionally, when the designated PUCCH resource is the PUCCH resource corresponding to the HARQ-ACK codebook having the higher priority, multiplexing the plurality of HARQ-ACK codebooks in the designated PUCCH resource further includes: configuring a PRI in last DCI of DCI corresponding to a PDSCH corresponding to each HARQ-ACK codebook in the plurality of HARQ-ACK codebooks to have a same value.

Optionally, the method further includes: configuring all PRIs in last DCI of DCI corresponding to PDSCHs corresponding to the plurality of HARQ-ACK codebooks to have the same value with the PRI in the last DCI of the DCI corresponding to the PDSCH corresponding to the HARQ-ACK codebook having the higher priority in the plurality of HARQ-ACK codebooks.

Optionally, the method further includes: the PUCCH resources respectively corresponding to the plurality of HARQ-ACK codebooks overlap with each other in the time domain; or the plurality of HARQ-ACK codebooks are assigned with a same PUCCH resource.

Optionally, a PUCCH set is determined according to a number of bits of HARQ-ACK information of a new HARQ-ACK codebook into which the plurality of HARQ-ACK codebooks are multiplexed; and the designated PUCCH resource is selected from the PUCCH set according to the PRI in the last DCI of the DCI corresponding to the PDSCH corresponding to the HARQ-ACK codebook having the higher priority.

Optionally, when the number of the bits of the HARQ-ACK information of the multiplexed new HARQ-ACK codebook corresponds to a same PUCCH set with that of a number of bits of the HARQ-ACK codebook having the higher priority, the PUCCH resource corresponding to the HARQ-ACK codebook having the higher priority is determined as the designated PUCCH resource.

Optionally, the plurality of HARQ-ACK codebooks is multiplexed into the new HARQ-ACK codebook according to a preset codebook arrangement order. The preset codebook arrangement order includes: multiplexing the plurality of HARQ-ACK codebooks into the new HARQ-ACK codebook according to an order of priorities of the plurality of HARQ-ACK codebooks from low to high; or multiplexing the plurality of HARQ-ACK codebooks into the new HARQ-ACK codebook according to an order of priorities of the plurality of HARQ-ACK codebooks from high to low.

Optionally, when a total number of the bits the new HARQ-ACK codebook is no more than 2, there is a predefined relationship between a bit value of the HARQ-ACK information of the new HARQ-ACK codebook and a sequence cyclic shift corresponding to the new HARQ-ACK codebook.

Optionally, the predefined relationship includes that the corresponding sequence cyclic shift in the case where the HARQ-ACK information of the new HARQ-ACK codebook has 1 bit and is a Negative Acknowledgement (NACK) is same as the corresponding sequence cyclic shift in a case where the HARQ-ACK information of the new HARQ-ACK codebook has 2 bits, the HARQ-ACK information having a higher priority is the NACK, and the HARQ-ACK information having a lower priority is the NACK.

Optionally, the predefined relationship includes that the corresponding sequence cyclic shift in a case where the HARQ-ACK information of the new HARQ-ACK codebook has 1 bit and is an Acknowledgement (ACK) is same as the corresponding sequence cyclic shift in a case where the HARQ-ACK information of the new HARQ-ACK codebook has 2 bits, the HARQ-ACK information of the HARQ-ACK codebook having the higher priority is the ACK, and the HARQ-ACK information of the HARQ-ACK codebooks having the lower priorities is the NACK.

Third Embodiment

A method for receiving resources is provided in this embodiment. FIG. 3 is a flowchart of the method for receiving resources according to the embodiment of the present application, and as shown in FIG. 3, the process includes the following step.

In step S302, a designated PUCCH is received and determined as a PUCCH resource determined according to a PRI in last DCI of DCI corresponding to a PDSCH corresponding to a HARQ-ACK codebook having a higher priority or a PUCCH resource corresponding to the HARQ-ACK codebook having the higher priority. A plurality of HARQ-ACK codebooks are multiplexed in the designated PUCCH resource, and the plurality of HARQ-ACK codebooks at least include the HARQ-ACK codebook having the higher priority.

Optionally, the designated PUCCH resource includes a new HARQ-ACK codebook into which the plurality of HARQ-ACK codebooks is multiplexed according to a preset codebook arrangement order. The preset codebook arrangement order includes that multiplexing the plurality of HARQ-ACK codebooks into the new HARQ-ACK codebook according to an order of priorities of the plurality of HARQ-ACK codebooks from low to high; or multiplexing the plurality of HARQ-ACK codebooks into the new HARQ-ACK codebook according to an order of priorities of the plurality of HARQ-ACK codebooks from high to low.

Optionally, when a total number of bits of the new HARQ-ACK codebook is no more than 2, there is a predefined relationship between values of bits of HARQ-ACK information of the new HARQ-ACK codebook and a sequence cyclic shift corresponding to the new HARQ-ACK codebook.

The predefined relationship is described in the Second Embodiment, and thus it will not be described too much.

The following scenarios are further provided, for a better understanding of the technical solutions described in the above embodiments.

It should be noted that in the following scenarios, two HARQ-ACK codebooks are taken as examples. If there are more than two HARQ-ACK codebooks, they may be processed in a pairwise manner.

Scenario One

A base station allocates PUCCH resources to two HARQ-ACK codebooks respectively, and then the base station and a UE agreeing on using a PRI value in last DCI corresponding to a HARQ-ACK codebook having a higher priority to determine a multiplexed PUCCH resource (that is, when a PUCCH of the HARQ-ACK codebook having the higher priority and a PUCCH of a HARQ-ACK codebook having a lower priority overlap with each other in a time domain, the HARQ-ACK codebooks in the two PUCCHs are multiplexed in a new PUCCH resource, and in this case, the PRI value in the last DCI corresponding to the HARQ-ACK codebook having the higher priority is used to determine the new PUCCH). Specifically, a corresponding PUCCH set is determined according to a number of bits after the two HARQ-ACK codebooks are multiplexed, and then the multiplexed PUCCH resource is determined from the determined PUCCH set by using the PRI value in the last DCI corresponding to the HARQ-ACK codebook having the higher priority. Note that in some cases, for example, if a total number of bits of HARQ-ACK after the two HARQ-ACK codebooks are multiplexed and a number of bits of the HARQ-ACK codebook having the higher priority correspond to the same PUCCH set, this method may be simply described as: the base station allocates the PUCCH resources to the two HARQ-ACK codebooks respectively, and then the base station and the UE agreeing on using the PUCCH resource of the HARQ-ACK codebook having the higher priority as the multiplexed PUCCH resource. That is, the base station allocates respective PUCCH resources to the two HARQ-ACK codebooks, and then the base station and the UE agreeing on not using the PRI value of the last DCI of all DCI corresponding to the two HARQ-ACK codebooks to determine the multiplexed PUCCH resource, since the last DCI may be DCI corresponding to the HARQ-ACK codebook having the lower priority which has a relatively large probability of being missed.

FIG. 4 is a schematic diagram of a time domain according to an embodiment of the present application. As shown in FIG. 4, four Downlink (DL) slots/sub-slots and one Uplink (UL) slot/sub-slot are illustrated in FIG. 4. As shown in FIG. 4, each DCI1 in the DL slots schedules a PDSCH having a lower priority (diagonal filled), and which corresponds to a HARQ-ACK codebook.

As shown in FIG. 4, the last DCI corresponding to the HARQ-ACK codebook is the DCI1 in the fourth DL. Assuming that a PRI value in the last DCI is 1, the corresponding PUCCH resource is finally determined as a PUCCH1 (by further combining with a number of bits of the HARQ-ACK codebook). Similarly, each DCI2 in the DL slots schedules a PDSCH having a higher priority (dot filled), which corresponds to another HARQ-ACK codebook. As shown in FIG. 4, the last DCI corresponding to the HARQ-ACK codebook is the DCI2 in the third DL. Assuming that a PRI value in the last DCI is 2, the corresponding PUCCH resource is finally determined as a PUCCH2 (by further combining with a number of bits of the HARQ-ACK codebook). However, since the PUCCH1 and the PUCCH2 overlap in the time domain, they need to be multiplexed in a same PUCCH. At this point, the UE determines a corresponding PUCCH set through a total number of bits after multiplexing of the two HARQ-ACK codebooks. Then a third PUCCH resource is selected from the determined PUCCH set by using the value 2 of the PRI in the last DCI2 corresponding to the HARQ-ACK codebook having the higher priority (here, it is assumed that the value 2 of the PRI represents the third PUCCH resource in the PUCCH set, that is, a PRI index starts from 0, and 0 represents the first PUCCH resource in the PUCCH set). If the total number of bits after multiplexing of the two HARQ-ACK codebooks and the number of bits of the HARQ-ACK codebook having the higher priority correspond to the same PUCCH set, the finally used PUCCH after the multiplexing is the PUCCH2 in the example illustrated in FIG. 4. If the total number of bits after multiplexing of the two HARQ-ACK codebooks and the quantity of bits of the HARQ-ACK codebook having the higher priority correspond to different PUCCH sets, in the example illustrated in FIG. 4, although the value of the PRI is 2, the used PUCCH after the multiplexing is the third PUCCH resource in the new PUCCH set since the PUCCH set has changed.

Scenario Two

The base station configures PRIs in the last DCI corresponding to at least two HARQ-ACK codebooks to the same value. Optionally, the base station further ensures that PUCCH resources of the two HARQ-ACK codebooks are in the same slot or sub-slot, so that the two codebooks will finally use the same PUCCH resource, which satisfies that the finally used PUCCH resource is the PUCCH resource having the higher priority.

Scenario Three

If the multiplexed two HARQ-ACK codebooks are still transmitted by using a PUCCH format 0, the HARQ-ACK codebook having the higher priority is placed in an agreed position. For example, the base station and the UE agree in prior on that the HARQ-ACK codebook having the higher priority is placed in a high position (following a principle of high left and low right), and the HARQ-ACK codebook having the lower priority is placed in a low position; or the HARQ-ACK codebook having the higher priority is placed in the low position (following the principle of high left and low right), and the HARQ-ACK codebook having the lower priority is placed in a high position.

To clarify, in the NR system, the maximum transmission HARQ-ACK codebook of the PUCCH format 0 is 2-bit information, which is carried by a sequence. The format 0 directly uses different sequences to represent corresponding HARQ-ACK values.

If the PUCCH resource used after the multiplexing is the PUCCH format 0, it is agreed on that the HARQ-ACK codebook having the higher priority is placed at the high position and the HARQ-ACK codebook having the lower priority is placed at the low position, and after the multiplexing, the two HARQ-ACK codebooks are transmitted in the PUCCH resource determined by using the PRI value in the last DCI corresponding to the HARQ-ACK codebook having the higher priority, the following mapping method may be adopted. When a total number of bits of HARQ-ACK information after the multiplexing of the two HARQ-ACK codebooks is 1-bit, the mapping is shown in Table 1 (which is only a specific example). When the total number of the bits of the HARQ-ACK information after the multiplexing of the two HARQ-ACK codebooks is 2-bit, the mapping is shown in Table 2 (which is only a specific example). An essence of the design of Table 2 is as follows: when the HARQ-ACK is 1-bit and is 0, a corresponding sequence cyclic shift is determined as a sequence cyclic shift corresponding to that the HARQ-ACK is 2-bit, the HARQ-ACK having the higher priority is 0 and the HARQ-ACK having the lower priority is 0; and when the HARQ-ACK is 1-bit and is 1, a corresponding sequence cyclic shift is determined as a sequence cyclic shift corresponding to that the HARQ-ACK is 2-bit, the HARQ-ACK having the higher priority is 1 and the HARQ-ACK is having the lower priority 0. In this way, when the DCI corresponding to the PDSCH corresponding to the HARQ-ACK codebook having the lower priority is missed (for semi-static PDSCHs, a PDSCH is directly missed), since the base station learns that the HARQ-ACK information corresponding to the HARQ-ACK codebook having the lower priority is 0, the PDSCH corresponding to the HARQ-ACK codebook having the lower priority can still be retransmitted. Herein, 0 represents a NACK and 1 represents an ACK.

TABLE 1

| HARQ-ACK Value | 0 | 1 |
|---|---|---|
| Sequence Cyclic Shift | $m_{cs} = 0$ | $m_{cs} = 6$ |

TABLE 2

| HARQ-ACK Value | {0, 0} | {0, 1} | {1, 0} | {1, 1} |
|---|---|---|---|---|
| Sequence Cyclic Shift | $m_{cs} = 0$ | $m_{cs} = 3$ | $m_{cs} = 6$ | $m_{cs} = 9$ |

TABLE 3

| HARQ-ACK Value | {0, 0} | {1, 0} | {0, 1} | {1, 1} |
|---|---|---|---|---|
| Sequence Cyclic Shift | $m_{cs} = 0$ | $m_{cs} = 3$ | $m_{cs} = 6$ | $m_{cs} = 9$ |

If the PUCCH resource used after the multiplexing is the PUCCH format 0, it is agreed that the HARQ-ACK codebook having the higher priority is placed at the low position and the HARQ-ACK codebook having the lower priority is placed at the high position, and after the multiplexing, the two HARQ-ACK codebooks are transmitted in the PUCCH resource determined by using the PRI value in the last DCI corresponding to the HARQ-ACK codebook having the higher priority, the following mapping method may be adopted. When the total number of the bits of the HARQ-ACK information after the multiplexing of the two HARQ-ACK codebooks is 1-bit, the mapping is shown in Table 1 (which is only a specific example). When the total number of the bits of the HARQ-ACK information after the multiplexing of the two HARQ-ACK codebooks is 2-bit, the mapping is shown in Table 3 (which is only a specific example). An essence of the design of Table 3 (which is same as that of Table 2) is as follows: when the HARQ-ACK is 1-bit and is 0, a corresponding sequence cyclic shift is determined as a sequence cyclic shift corresponding to that the HARQ-ACK is 2-bit, the HARQ-ACK having the higher priority is 0 and the HARQ-ACK having the lower priority is 0; and when the HARQ-ACK is 1-bit and is 1, a corresponding sequence cyclic shift is determined as a sequence cyclic shift corresponding to that the HARQ-ACK is 2-bit, the HARQ-ACK having the higher priority is 1 and the HARQ-ACK having the lower priority is 0.

Therefore, for the HARQ-ACK codebooks of different priorities, including the multiplexing of the HARQ-ACK codebooks having higher and lower priorities, after a corresponding relationship between the HARQ-ACK value and the sequence cyclic shift in the case of the HARQ-ACK being 1-bit is defined, the design method of the HARQ-ACK value and the sequence cyclic shift in the case of the HARQ-ACK being 2-bit is as follows: when the HARQ-ACK is 1-bit and is 0, a corresponding sequence cyclic shift is determined as the sequence cyclic shift corresponding to that the HARQ-ACK is 2-bit, the HARQ-ACK having the higher priority is 0 and the HARQ-ACK having the lower priority is 0; and when the HARQ-ACK is 1-bit and is 1, a corresponding sequence cyclic shift is determined as a sequence cyclic shift corresponding to that the HARQ-ACK is 2-bit, the HARQ-ACK having the higher priority is 1 and the HARQ-ACK having the lower priority is 0. This design method may also be described as conditions to be satisfied by the relationship between the HARQ-ACK value and the sequence cyclic shift in the case where the HARQ-ACK is 1-bit and the relationship between the HARQ-ACK value and the sequence cyclic shift in the case where the HARQ-ACK is 2-bit.

Scenario Four

When the two HARQ-ACK codebooks are multiplexed and transmitted in a PUCCH format 2/3/4, they are processed in the following manner to ensure the reliability of the HARQ-ACK codebook having the higher priority. In the NR system, a number of bits carried in the PUCCH format 2/3/4 is greater than 2 bits.

If the two HARQ-ACK codebooks are multiplexed and transmitted in one PUCCH resource (herein, the PUCCH resource used after the multiplexing of the two HARQ-ACK codebooks is determined according to the First Embodiment) and the PUCCH resource is in the format 2/3/4, then the two HARQ-ACK codebooks are encoded and modulated independently, and encoded and modulated information of the HARQ-ACK codebook having the higher priority is mapped into the PUCCH resource first and then encoded and modulated information of the HARQ-ACK codebook having the lower priority is mapped into remaining resources in the PUCCH resource. When the encoded and modulated information of the HARQ-ACK codebook having the lower priority is mapped into the remaining resources in the PUCCH resource, if the HARQ-ACK codebook having the lower priority is encoded and modulated at a configured maximum bit rate r, and the encoded and modulated information requires more resources than the remaining resources, then HARQ-ACK codebook information of the HARQ-ACK codebook having the lower priority is discarded until the information encoded and modulated at the configured maximum bit rate r is exactly used all the remaining resources.

Optionally, when the HARQ-ACK codebook having the lower priority is carried in the remaining resources, if all the information encoded and modulated at the configured bit rate r cannot be carried in the remaining resources, the 1 HARQ-ACK codebook having the lower priority is encoded and modulated at a bit rate r1 and it is ensured that the encoded and modulated information exactly occupies all the remaining resources. The bit rate r1 is determined according to a number of the remaining resources and a number of bits of the HARQ-ACK codebook having the lower priority. That is, after the HARQ-ACK codebook having the lower priority is encoded and modulated according to the bit rate r1, all the bits are transmitted in the remaining resources without discarding part of the bits.

In this way, performance of the HARQ-ACK codebook having the higher priority will be not degraded by the multiplexing of the HARQ-ACK codebook having the higher priority and the HARQ-ACK codebook having the lower priority in one PUCCH resource, because for the HARQ-ACK having the higher priority, the encoding and modulating, mapping, and the used resource are essentially independent.

Through the description of the above embodiments, a person having ordinary skill in the art would understand that the methods in the above embodiments can be realized by means of software and necessary general hardware platforms; and of course, they can also be realized by hardware. Based on this understanding, the technical solution of the present application can be embodied in the form of a software product, which is stored in a storage medium (such as a Read-Only Memory (ROM)/Random Access Memory (RAM), a disk, or a CD) and contains several instructions to cause a terminal device (which may be a mobile phone, a computer, a server, or a network equipment, etc.) to perform the method described in each embodiment of the present application.

Fourth Embodiment

In this embodiment, a device for determining resources is further provided, and the device is used to implement the above-mentioned embodiments and optional implementations, and those that have been described will not be repeated. As used below, the term "module" is a combination of software and/or hardware that can implement predetermined functions. Although the devices described in the following embodiments are preferably implemented by software, implementation by hardware or a combination of software and hardware is also possible and conceived.

Figure 5:
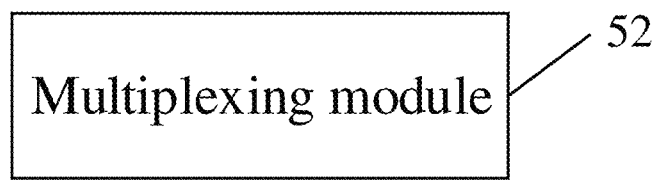
FIG. 5 is a structural block diagram of a device for determining resources according to an embodiment of the present application.

FIG. 5 is a structural block diagram of the device for determining resources according to the embodiment of the present application. As shown in FIG. 5, the device includes the followings.

A multiplexing module 52 is configured to multiplex a plurality of HARQ-ACK codebooks in a designated PUCCH resource. The designated PUCCH resource at least includes one of: a PUCCH resource determined according to a PRI in last DCI of DCI corresponding to a PDSCH corresponding to a HARQ-ACK codebook having a higher priority in the plurality of HARQ-ACK codebooks, and a PUCCH resource corresponding to the HARQ-ACK codebook having the higher priority in the plurality of HARQ-ACK codebooks.

Fifth Embodiment

In this embodiment, a device for receiving resources is further provided, and the device is used to implement the above-mentioned embodiments and optional implementations, and those that have been described will not be repeated. As used below, the term "module" is a combination of software and/or hardware that can implement predetermined functions. Although the devices described in the following embodiments are preferably implemented by software, implementation by hardware or a combination of software and hardware is also possible and conceived.

Figure 6:
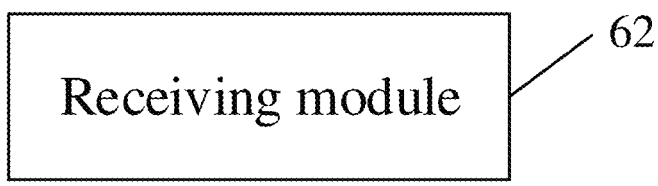
FIG. 6 is a structural block diagram of a device for receiving resources according to an embodiment of the present application.

FIG. 6 is a structural block diagram of the device for receiving resources according to the embodiment of the present application. As shown in FIG. 6, the device includes the followings.

A receiving module 62 is configured to receive a designated PUCCH, and determine that a designated PUCCH resource is a PUCCH resource determined according to a PRI in last DCI of DCI corresponding to a PDSCH corresponding to a HARQ-ACK codebook having a higher priority or a PUCCH resource corresponding to the HARQ-ACK codebook having the higher priority. A plurality of HARQ-ACK codebooks are multiplexed in the designated PUCCH resource, and the plurality of HARQ-ACK codebooks at least include the HARQ-ACK codebook having the higher priority.

Sixth Embodiment

The embodiments of the present application further provide a storage medium, and a computer program is stored in the storage medium. The computer program is configured to, when being executed, perform the steps in any one of the above-mentioned method embodiments.

Optionally, in this embodiment, the above-mentioned storage medium may be configured to store a computer program for performing the following step.

In step S1, a plurality of HARQ-ACK codebooks are multiplexed in a designated PUCCH resource. The designated PUCCH resource at least includes one of: a PUCCH resource determined according to a PRI in last DCI of DCI corresponding to a PDSCH corresponding to a HARQ-ACK codebook having a higher priority in the plurality of HARQ-ACK codebooks, and a PUCCH resource corresponding to the HARQ-ACK codebook having the higher priority in the plurality of HARQ-ACK codebooks.

Optionally, in step S1, a designated PUCCH is received and determined as a PUCCH resource determined according to a PRI in last DCI of DCI corresponding to a PDSCH corresponding to a HARQ-ACK codebook having a higher priority or a PUCCH resource corresponding to the HARQ-ACK codebook having the higher priority. A plurality of HARQ-ACK codebooks are multiplexed in the designated PUCCH resource, and the plurality of HARQ-ACK codebooks at least include the HARQ-ACK codebook having the higher priority.

Optionally, in this embodiment, the storage medium may include, but is not limited to, any medium that can store the computer program, such as a USB flash disk, a ROM, a RAM, a removable hard disk, a magnetic disk, or a compact disk.

The embodiments of the present application further provide an electronic device, including a memory and a processor, the memory is stored a computer program, and the processor is configured to execute the computer program to perform the steps in any one of the above-mentioned method embodiments.

Optionally, the electronic device may further include a transmission device and an input/output device. The transmission device is connected to the processor, and the input/output device is connected to the processor.

Optionally, in this embodiment, the above-mentioned processor may be configured to perform the following steps through the computer program.

In step S1, a plurality of HARQ-ACK codebooks are multiplexed in a designated PUCCH resource. The designated PUCCH resource at least includes one of: a PUCCH resource determined according to a PRI in last DCI of DCI corresponding to a PDSCH corresponding to a HARQ-ACK codebook having a higher priority in the plurality of HARQ-ACK codebooks, and a PUCCH resource corresponding to the HARQ-ACK codebook having the higher priority in the plurality of HARQ-ACK codebooks.

Optionally, in step S1, a designated PUCCH is received and determined as a PUCCH resource determined according to a PRI in last DCI of DCI corresponding to a PDSCH corresponding to a HARQ-ACK codebook having a higher priority or a PUCCH resource corresponding to the HARQ-ACK codebook having the higher priority. A plurality of HARQ-ACK codebooks are multiplexed in the designated PUCCH resource, and the plurality of HARQ-ACK codebooks at least include the HARQ-ACK codebook having the higher priority.

Optionally, for specific examples in this embodiment, reference may be made to the examples described in the above-mentioned embodiments and alternative implementations, and the specific examples will not be repeated in this embodiment.

Obviously, a person having ordinary skill in the art would understand that the above modules and steps of the present application can be realized by using a universal computing device, which can be integrated in a single computing device or distributed on a network that consists of a plurality of computing devices, or can be alternatively realized by using executable program codes of the computing device, so that they can be stored in a storage device and executed by the computing device. In some cases, the shown or described steps can be performed in a sequence other than herein, or the modules are made into various integrated circuit modules respectively, or a plurality of modules or steps among them are made into a single integrated circuit module, thus to be realized. Thus, the present application is not limited to any specific combination of hardware and software.

The above descriptions are merely optional embodiments of the present application, which are not intended to limit the present application. For those having ordinary skill in the art, the present application may have various changes and variations. Any amendments, equivalent substitutions, improvements, etc., within the principle of the present application are included in the scope of protection defined by the appended claims of the present application.

The invention claimed is:

1. A method for determining resources, comprising:
multiplexing, by a terminal device, a plurality of Hybrid Automatic Repeat reQuest Acknowledgement (HARQ-ACK) codebooks having different priorities and corresponding to different Physical Uplink Control Channels (PUCCHs) in a designated PUCCH resource, wherein the different priorities comprise a low priority and a high priority;
wherein the designated PUCCH resource is determined according to a PUCCH resource indicator (PRI) in a last Downlink Control Information (DCI) of DCI(s) corresponding to one or more Downlink Physical Shared Channels (PDSCHs) corresponding to a HARQ-ACK codebook having the high priority in the plurality of HARQ-ACK codebooks;
wherein determining of the designated PUCCH resource comprises:
determining, by the terminal device, a PUCCH set according to a number of bits of HARQ-ACK information of a new HARQ-ACK codebook into which the plurality of HARQ-ACK codebooks having different priorities are multiplexed; and
selecting, by the terminal device, the designated PUCCH resource from the PUCCH set according to the PRI in the last DCI of the DCI(s) corresponding to the one or more PDSCHs corresponding to the HARQ-ACK codebook having the high priority.

2. The method according to claim 1, wherein multiplexing the plurality of HARQ-ACK codebooks in the designated PUCCH resource comprises:
configuring PRIs in the last DCI of the DCI(s) corresponding to the one or more PDSCHs corresponding to all HARQ-ACK codebooks in the plurality of HARQ-ACK codebooks to have a same value.

3. The method according to claim 2, wherein configuring the PRIs in the last DCI of the DCI(s) corresponding to the one or more PDSCHs corresponding to all the HARQ-ACK codebooks in the plurality of HARQ-ACK codebooks to have the same value comprises: configuring a PRI in the last DCI of the DCI(s) corresponding to a PDSCH corresponding to each HARQ-ACK codebook in the plurality of HARQ-ACK codebooks to have the same value with the PRI in the last DCI of the DCI(s) corresponding to the one or more PDSCHs corresponding to the HARQ-ACK codebook having the high priority in the plurality of HARQ-ACK codebooks.

4. The method according to claim 1, wherein PUCCH resources corresponding to the plurality of HARQ-ACK codebooks overlap with each other in a time domain.

5. The method according to claim 1, further comprising:
in a case of the number of bits of the HARQ-ACK information of the new HARQ-ACK codebook corresponding to a same PUCCH set with a number of bits of the HARQ-ACK codebook having the high priority, determining the designated PUCCH resource according to the HARQ-ACK codebook having the high priority.

6. The method according to claim 1, comprising:
multiplexing the plurality of HARQ-ACK codebooks into the new HARQ-ACK codebook according to a preset codebook arrangement order;
wherein the preset codebook arrangement order comprises: multiplexing the plurality of HARQ-ACK codebooks into the new HARQ-ACK codebook according to an order of priorities of the plurality of HARQ-ACK codebooks from high to low.

7. The method according to claim 6, wherein in a case of a total number of bits of the new HARQ-ACK codebook being no more than 2, there is a predefined relationship between a bit value of the HARQ-ACK information of the new HARQ-ACK codebook and a sequence cyclic shift.

8. The method according to claim 7, wherein the predefined relationship comprises:
the sequence cyclic shift corresponding to the new HARQ-ACK codebook in a case of the total number of bits of the new HARQ-ACK codebook being 1 and the HARQ-ACK information of the new HARQ-ACK codebook being a Negative Acknowledgement (NACK), and the sequence cyclic shift being same as a sequence cyclic shift corresponding to the new HARQ-ACK codebook in a case of the number of the bits of the new HARQ-ACK codebook being 2, the HARQ-ACK codebook having the high priority being the NACK, and another HARQ-ACK codebook having the low priority being the NACK.

9. The method according to claim 7, wherein the predefined relationship comprises:

the sequence cyclic shift corresponding to the new HARQ-ACK codebook in a case of the total number of bits of the new HARQ-ACK codebook being 1 and the HARQ-ACK information of the new HARQ-ACK codebook being an Acknowledgement (ACK), and the sequence cyclic shift being same as a sequence cyclic shift corresponding to the new HARQ-ACK codebook in a case of the total number of the bits of the new HARQ-ACK codebook being 2, the HARQ-ACK codebook having the high priority being the ACK, and another HARQ-ACK codebook having the low priority being a NACK.

10. A non-transitory computer-readable storage medium storing a computer program thereon, wherein the computer program is configured to perform the method according to claim 1 when executed.

11. A method for receiving resources, comprising:
receiving, by a base station, a designated Physical Uplink Control Channel (PUCCH) resource,
wherein the designated PUCCH resource is determined according to a PUCCH resource indicator (PRI) in last Downlink Control Information (DCI) of DCI(s) corresponding to one or more Downlink Physical Shared Channels (PDSCHs) corresponding to a Hybrid Automatic Repeat Request Acknowledgement (HARQ-ACK) codebook having a high priority in a plurality of HARQ-ACK codebooks; wherein the plurality of HARQ-ACK codebooks having different priorities and corresponding to different PUCCHs are multiplexed in the designated PUCCH resource, wherein the different priorities comprise a low priority and the high priority,
wherein the designated PUCCH resource is determined based on:
determining a PUCCH set according to a number of bits of HARQ-ACK information of a new HARQ-ACK codebook into which the plurality of HARQ-ACK codebooks having the different priorities are multiplexed; and
selecting the designated PUCCH resource from the PUCCH set according to the PRI in the last DCI of the DCI(s) corresponding to the one or more PDSCHs corresponding to the HARQ-ACK codebook having the high priority.

12. The method according to claim 11, wherein the designated PUCCH resource comprises: the new HARQ-ACK codebook into which the plurality of HARQ-ACK codebooks are multiplexed according to a preset codebook arrangement order; wherein the preset codebook arrangement order comprises: multiplexing the plurality of HARQ-ACK codebooks into the new HARQ-ACK codebook according to an order of priorities of the plurality of HARQ-ACK codebooks from high to low.

13. The method according to claim 11, wherein in a case of a total number of bits of the new HARQ-ACK codebook being no more than 2, there is a predefined relationship between a bit value of the_HARQ-ACK information of the new HARQ-ACK codebook and a sequence cyclic shift corresponding to the new HARQ-ACK codebook.

14. A non-transitory computer-readable storage medium storing a computer program thereon, wherein the computer program is configured to perform the method according to claim 11 when executed.

15. An electronic device, comprising a memory and a processor; wherein the memory stores a computer program therein, and the processor is configured to execute the computer program to perform:

multiplexing a plurality of Hybrid Automatic Repeat reQuest Acknowledgement (HARQ-ACK) codebooks having different priorities and corresponding to different Physical Uplink Control Channels (PUCCHs) in a designated PUCCH resource; wherein the different priorities comprise a low priority and a high priority, wherein the designated PUCCH resource is determined according to a PUCCH resource indicator (PRI) in a last Downlink Control Information (DCI) of DCI(s) corresponding to one or more Downlink Physical Shared Channels (PDSCHs) corresponding to a HARQ-ACK codebook having the high priority in the plurality of HARQ-ACK codebooks,
wherein the processor is configured to determine the designated PUCCH resource based on:
determining a PUCCH set according to a number of bits of HARQ-ACK information of a new HARQ-ACK codebook into which the plurality of HARQ-ACK codebooks having different priorities are multiplexed; and
selecting the designated PUCCH resource from the PUCCH set according to the PRI in the last DCI of the DCI(s) corresponding to the one or more PDSCHs corresponding to the HARQ-ACK codebook having the high priority.

16. The electronic device according to claim 15, wherein the processor is configured to execute the computer program to perform: configuring PRIs in the last DCI of the DCI(s) corresponding to the one or more PDSCHs corresponding to all HARQ-ACK codebooks in the plurality of HARQ-ACK codebooks to have a same value.

17. The electronic device according to claim 16, wherein the processor is configured to execute the computer program to perform:
configuring a PRI in the last DCI of the DCI(s) corresponding to a PDSCH corresponding to each HARQ-ACK codebook in the plurality of HARQ-ACK codebooks to have the same value with the PRI in the last DCI of the DCI(s) corresponding to the one or more PDSCHs corresponding to the HARQ-ACK codebook having the high priority in the plurality of HARQ-ACK codebooks.

18. An electronic device, comprising a memory and a processor; wherein the memory stores a computer program therein, and the processor is configured to execute the computer program to perform;
receiving a designated Physical Uplink Control Channel (PUCCH) resource,
wherein the designated PUCCH resource is determined according to a PUCCH resource indicator (PRI) in last Downlink Control Information (DCI) of DCI(s) corresponding to one or more Downlink Physical Shared Channels (PDSCHs) corresponding to a Hybrid Automatic Repeat Request Acknowledgement (HARQ-ACK) codebook having a high priority in a plurality of HARQ-ACK codebooks; wherein the plurality of HARQ-ACK codebooks having different priorities and corresponding to different PUCCHs are multiplexed in the designated PUCCH resource, wherein the different priorities comprise a low priority and the high priority,
wherein the designated PUCCH resource is determined based on:
determining a PUCCH set according to a number of bits of HARQ-ACK information of a new HARQ-ACK codebook into which the plurality of HARQ-ACK codebooks having the different priorities are multiplexed; and selecting the designated PUCCH resource from the PUCCH set according to the PRI in the last DCI of the DCI(s) corresponding to the one or more PDSCHs corresponding to the HARQ-ACK codebook having the high priority.

19. The electronic device according to claim 18, wherein the designated PUCCH resource comprises: the new HARQ-ACK codebook into which the plurality of HARQ-ACK codebooks are multiplexed according to a preset codebook arrangement order; wherein the preset codebook arrangement order comprises multiplexing the plurality of HARQ-ACK codebooks into the new HARQ-ACK codebook according to an order of priorities of the plurality of HARQ-ACK codebooks from high to low.

* * * * *